(12) United States Patent
Ohmori

(10) Patent No.: US 11,600,829 B2
(45) Date of Patent: Mar. 7, 2023

(54) FUEL CELL SEPARATOR MEMBER AND FUEL CELL

(71) Applicant: HONDA MOTOR CO., LTD., Tokyo (JP)

(72) Inventor: Suguru Ohmori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 17/166,212

(22) Filed: Feb. 3, 2021

(65) Prior Publication Data

US 2021/0242475 A1    Aug. 5, 2021

(30) Foreign Application Priority Data

Feb. 5, 2020    (JP) .............................. JP2020-017606

(51) Int. Cl.
*H01M 8/0247*    (2016.01)
*H01M 8/1004*    (2016.01)

(52) U.S. Cl.
CPC ....... *H01M 8/0247* (2013.01); *H01M 8/1004* (2013.01)

(58) Field of Classification Search
CPC ............. H01M 8/0247; H01M 8/1004; H01M 8/2475; H01M 2008/1095; H01M 8/0202; H01M 8/0297; H01M 8/242; H01M 8/2465; H01M 8/02; H01M 8/0258; H01M 8/0271; H01M 8/0273; Y02E 60/50
See application file for complete search history.

(56) References Cited

U.S. PATENT DOCUMENTS

| | | |
|---|---|---|
| 2018/0366761 A1 | 12/2018 | Ohmori et al. |
| 2018/0366762 A1* | 12/2018 | Ohmori .................. H01M 8/248 |
| 2019/0319280 A1* | 10/2019 | Ohmori ............... H01M 8/0276 |

FOREIGN PATENT DOCUMENTS

JP        2019-003830 A    1/2019

* cited by examiner

*Primary Examiner* — Helen Oi K Conley
(74) *Attorney, Agent, or Firm* — Carrier Shende & Associates, P.C.; Fulchand P. Shende; Joseph P. Carrier

(57) ABSTRACT

A fuel cell separator member forming a power generation cell includes a first separator, and a load receiver member disposed in a manner to protrude outward from the first separator. Reinforcement ribs extending in a direction in which the load receiver member protrudes are provided in a part of an outer peripheral portion of the first separator, the part being adjacent to a joint portion.

18 Claims, 6 Drawing Sheets

FUEL CELL SEPARATOR MEMBER AND FUEL CELL

CROSS-REFERENCE TO RELATED APPLICATION

This application is based upon and claims the benefit of priority from Japanese Patent Application No. 2020-017606 filed on Feb. 5, 2020, the contents of which are incorporated herein by reference.

BACKGROUND OF THE INVENTION

Field of the Invention

The present invention relates to a fuel cell separator member and a fuel cell.

Description of the Related Art

For example, Japanese Laid-Open Patent Publication No. 2019-003830 discloses a fuel cell separator member including a separator and a load receiver member joined to the separator in a manner to protrude outward from the separator. When an external load is applied to the separator in the width direction of the separator (in a direction perpendicular to the separator thickness direction and a direction in which a tab protrudes), the load receiver member contacts an outer support member to receive the external load.

SUMMARY OF THE INVENTION

When the load receiver member receives the external load, the stress tends to be concentrated at the joint portion between the outer peripheral portion of the separator and the load receiver. Therefore, it is required to improve the joining strength of joining the outer peripheral portion of the separator and the load receiver member together.

The present invention has been made taking such a problem into account, and an object of the present invention is to provide a fuel cell separator and a fuel cell in which it is possible to achieve improvement in the joining strength of joining an outer peripheral portion of the separator and a load receiver member together.

According to an aspect of the present invention, provided is a fuel cell separator member including a separator, a load receiver member disposed in a manner to protrude outward from the separator, and a joint portion configured to join an outer peripheral portion of the separator and the load receiver member together. A reinforcement rib extending in a direction in which the load receiver member protrudes is provided in a part of the outer peripheral portion of the separator, the part being adjacent to the joint portion.

According to another aspect of the present invention, provided is a fuel cell including a membrane electrode assembly including an electrolyte membrane, and electrodes provided on both sides of the electrolyte membrane, and a pair of separators provided on both sides of the membrane electrode assembly. At least one of the separators of the pair forms the fuel cell separator member described above.

In the present invention, the reinforcement rib extending in the direction in which the load receiver member protrudes is provided in a part of the outer peripheral portion of the separator, the part being adjacent to the joint portion. Therefore, the reinforcement rib can improve the joining strength of joining the outer peripheral portion of the separator and the load receiver together. Further, the reinforcement rib extends in a direction perpendicular to the width direction of the load receiver member. Therefore, when the external load is applied to the separator, it is possible to effectively suppress deformation of a part of the outer peripheral portion of the separator, the part supporting the load receiver member.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell separator member and a fuel cell according to the present invention will be described with reference to the drawings.

Figure 1:
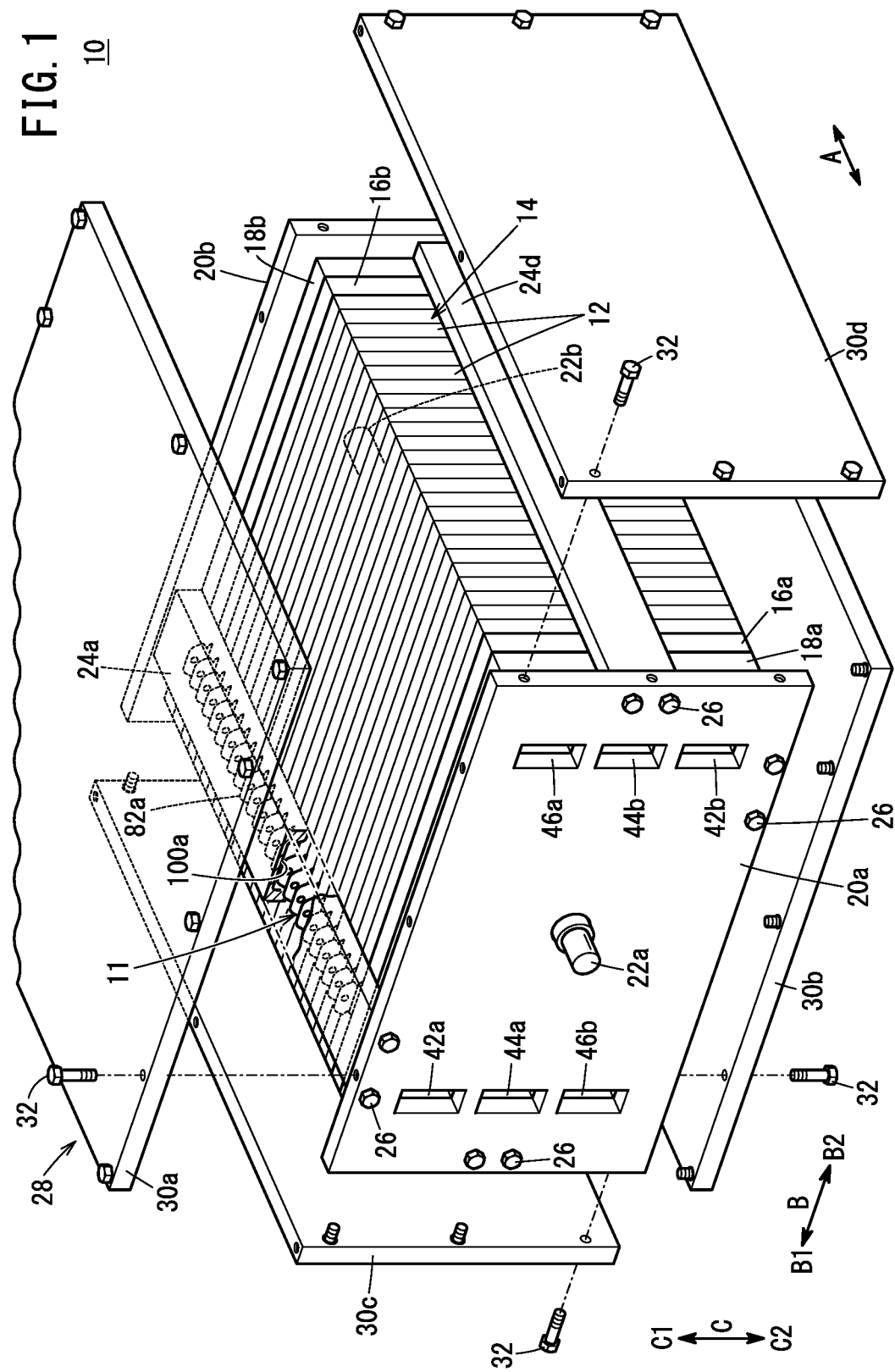
FIG. 1 is a partial exploded perspective view showing a fuel cell stack including a fuel cell separator member according to an embodiment of the present invention.

As shown in FIG. 1, a fuel cell stack 10 according to an embodiment of the present invention includes a stack body 14 formed by stacking a plurality of power generation cells 12 (fuel cells) together. For example, the fuel cell stack 10 is mounted in a fuel cell automobile in a manner that the stacking direction of the plurality of power generation cells 12 (indicated by an arrow A) is oriented in the horizontal direction (the vehicle width direction or the vehicle length direction) of a fuel cell automobile. It should be noted that the fuel cell stack 10 may be mounted in the fuel cell automobile in a manner that the stacking direction of the plurality of power generation cells 12 is oriented in the vertical direction (vehicle height direction) of the fuel cell automobile.

At one end of the stack body 14 in a stacking direction, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b.

An output terminal 22a is electrically connected to the terminal plate 16a. An output terminal 22b is electrically connected to the terminal plate 16b. Each of the insulators 18a, 18b is an electrically insulating plate.

Figure 2:
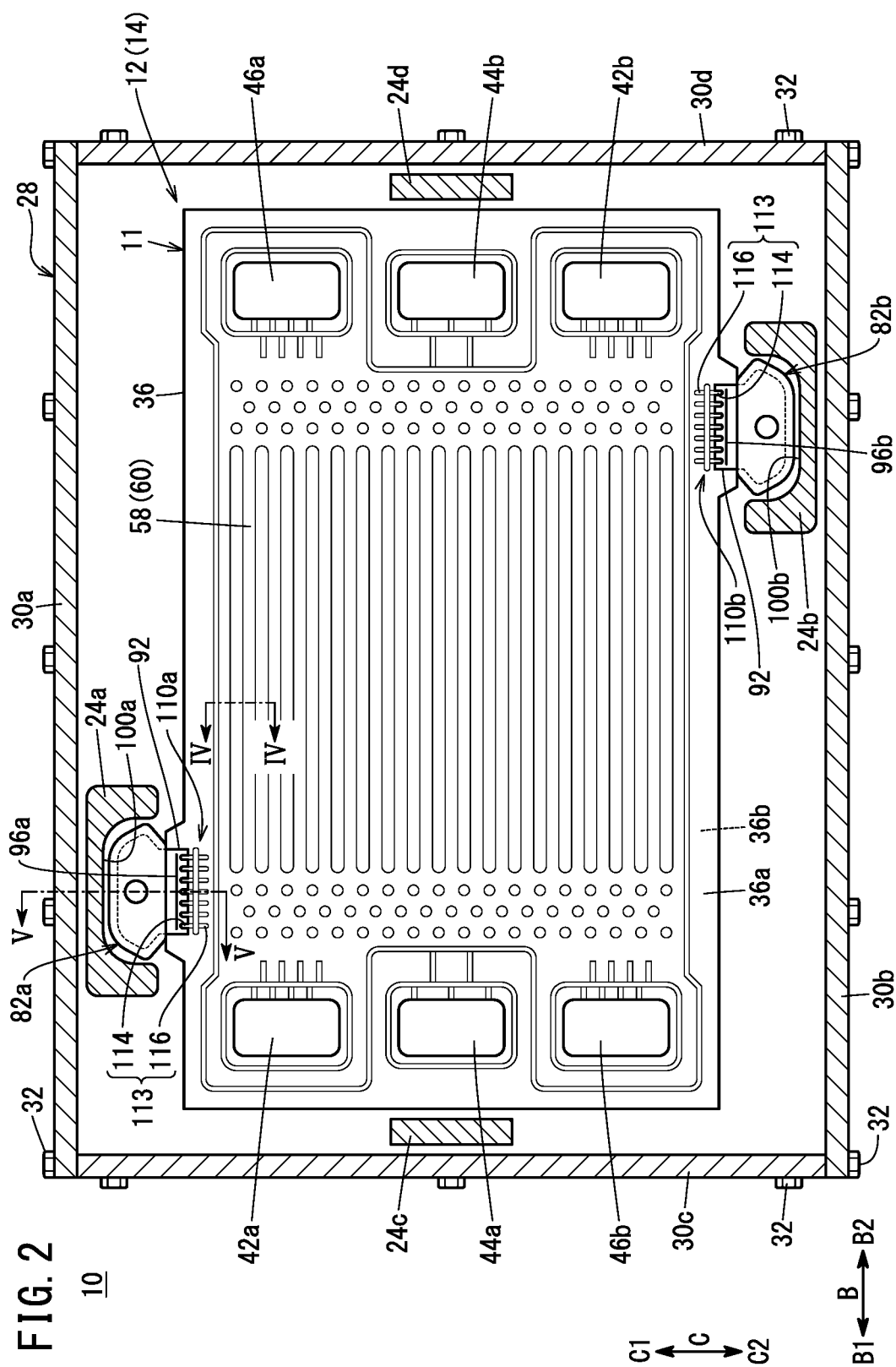
FIG. 2 is a lateral cross sectional view schematically showing the fuel cell stack shown in FIG. 1.

Each of the end plates 20a, 20b has a laterally elongated rectangular shape. As shown in FIGS. 1 and 2, coupling members 24a to 24d (coupling bars) are disposed between the sides of the end plates 20a, 20b. Both ends of the coupling members 24a to 24d are fixed to inner surfaces of the end plates 20a, 20b using bolts 26 (see FIG. 1). In this manner, the coupling members 24a to 24d apply the tightening load (compression load) in the stacking direction of the fuel cell stack 10 (stack body 14) (indicated by the arrow A).

In FIG. 2, the position of the coupling member 24a is shifted from the center toward one end of the long side of one of the end plates 20a, 20b (in the direction indicated by an arrow B1). The position of the coupling member 24b is shifted from the center toward the other end of the long side of the other side of the end plate 20a, 20b (in the direction indicated by an arrow B2). The coupling members 24c, 24d are positioned at the centers of the short sides of the end plates 20a, 20b.

As shown in FIGS. 1 and 2, the fuel cell stack 10 includes a cover 28 which covers the stack body 14 from directions (indicated by arrows B and C) perpendicular to the stacking direction. The cover 28 includes a pair of side panels 30a, 30b having a laterally elongated plate shape forming two surfaces at both ends of the end plates 20a, 20b in the lateral direction (indicated by the arrow C), and a pair of side panels 30c, 30d having a laterally elongated plate shape forming two surfaces at both ends of the end plates 20a, 20b in the longitudinal direction (indicated by the arrow B).

Each of the side panels 30a to 30d is fixed to side surfaces of the end plates 20a, 20b using bolts 32. It is adequate that the cover 28 is used as necessary. The cover 28 may be dispensed with. The cover 28 may have a cylindrical shape, produced by forming the side panels 30a to 30d integrally into one piece by casting or extrusion.

Figure 3:
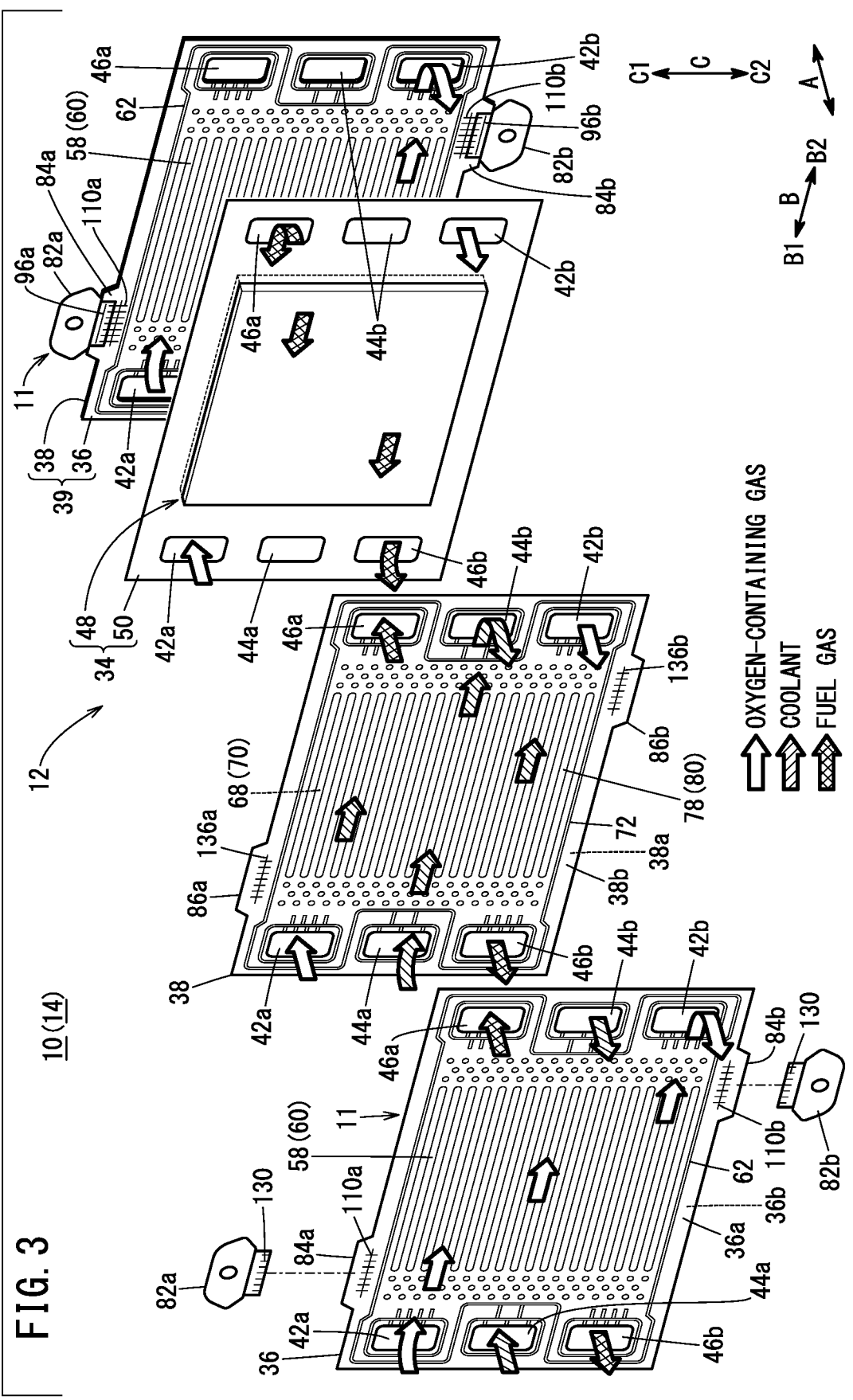
FIG. 3 is an exploder perspective view showing a stack body of the fuel cell stack in FIG. 1.

As shown in FIG. 3, the power generation cell 12 includes a resin frame equipped MEA 34, and a first separator 36 and a second separator 38 sandwiching the resin frame equipped MEA 34 in the direction indicated by the arrow A.

At one end of the power generation cells 12 in the long side direction indicated by the arrow B (in the direction indicated by the arrow B1), an oxygen-containing gas supply passage 42a, a coolant supply passage 44a, and a fuel gas discharge passage 46b are arranged in a direction indicated by the arrow C. The oxygen-containing gas supply passage 42a of each of the power generation cells 12 extends through the plurality of power generation cells 12 in the stacking direction (indicated by the arrow A) for supplying the oxygen-containing gas. The coolant supply passage 44a extends through each of the power generation cells 12 in the direction indicated by the arrow A for supplying a coolant (such as pure water ethylene glycol, oil). The fuel gas discharge passage 46b extends through each of the power generation cells 12 in the direction indicated by the arrow A for discharging a fuel gas (e.g., a hydrogen containing gas).

At the other end of the power generation cells 12 in the direction indicated by the arrow B (in the direction indicated by the arrow B2), a fuel gas supply passage 46a, a coolant discharge passage 44b, and an oxygen-containing gas discharge passage 42b are arranged in the direction indicated by the arrow C. The fuel gas supply passage 46a extends through each of the power generation cells 12 in the direction indicated by the arrow A, for supplying a fuel gas. The coolant discharge passage 44b extends through each of the power generation cells 12 in the direction indicated by the arrow A, for discharging the coolant. The oxygen-containing gas discharge passage 42b extends through each of the power generation cells 12 in the direction indicated by the arrow A, for discharging the oxygen-containing gas.

It should be noted that the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are formed also in the end plate 20a (see FIG. 1).

The sizes, positions, shapes, and the numbers of the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are not limited to the embodiment, and may be determined as necessary depending on the required specification.

Figure 4:
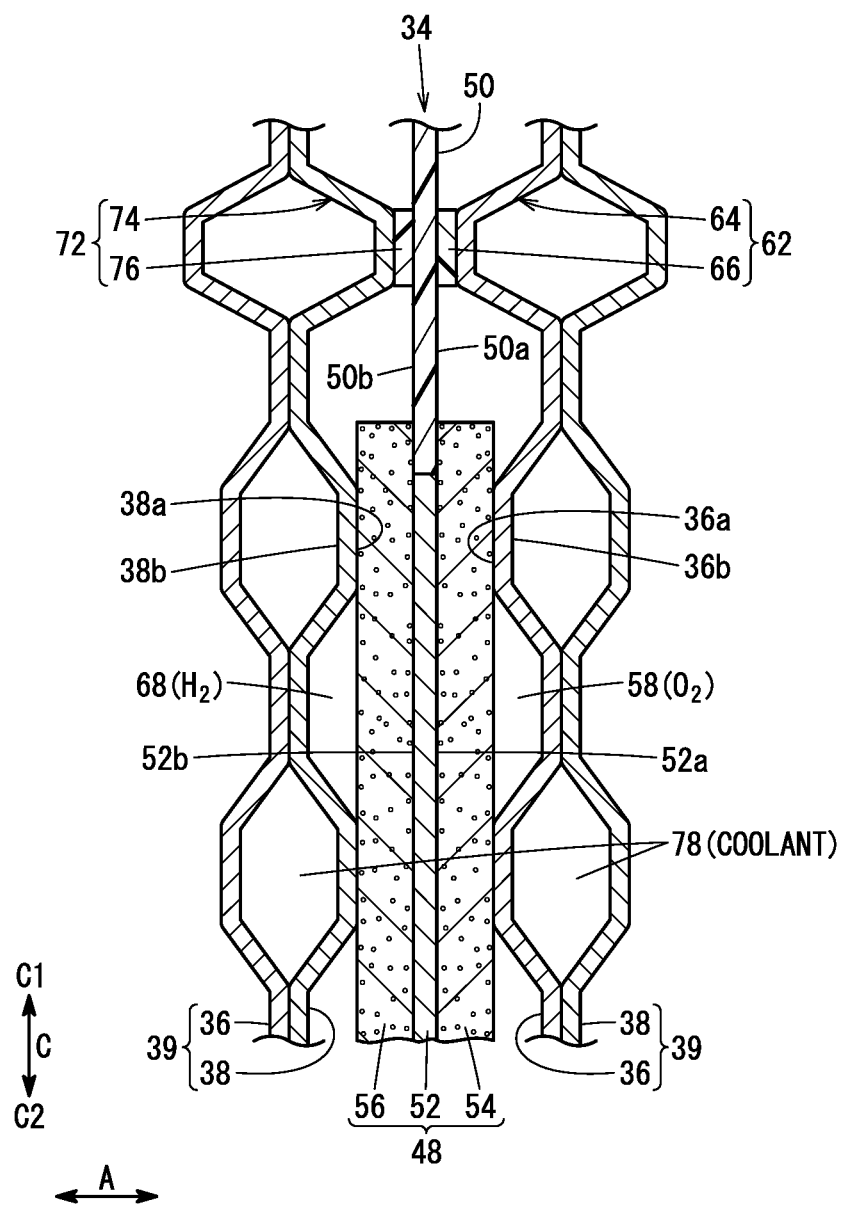
FIG. 4 is a cross sectional view taken along a line IV-IV in FIG. 2.

As shown in FIGS. 3 and 4, the resin frame equipped MEA 34 includes a membrane electrode assembly (hereinafter referred to as an "MEA 48"), and a resin frame member 50 (resin frame part, resin film) including an overlap portion overlapped with and joined to the outer peripheral portion of the MEA 48, and formed around the outer peripheral portion of the MEA 48. In FIG. 4, the MEA 48 includes an electrolyte membrane 52, a cathode 54 provided on one surface 52a of the electrolyte membrane 52, and an anode 56 provided on another surface 52b of the electrolyte membrane 52.

For example, the electrolyte membrane 52 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 52. Alternatively, an HC (hydrocarbon) based electrolyte may be used as the electrolyte membrane 52. The electrolyte membrane 52 is held between the cathode 54 and the anode 56.

Although not shown in details, the cathode 54 includes a first electrode catalyst layer joined to one surface 52a of the electrolyte membrane 52, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles.

The anode 56 includes a second electrode catalyst layer joined to the other surface 52b of the electrolyte membrane 52, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles. Each of the first gas diffusion layer and the second gas diffusion layer comprises a carbon paper, a carbon cloth, etc.

The surface size of the electrolyte membrane 52 is smaller than the surface sizes of the cathode 54 and the anode 56. The outer marginal portion of the cathode 54 and the outer marginal portion of the anode 56 hold the inner marginal portion of the resin frame member 50. The resin frame member 50 has non-impermeable structure where the reactant gases (the oxygen-containing gas and the fuel gas) do not pass through the resin frame member 50. The resin frame member 50 is provided on the outer peripheral side of the MEA 48.

The resin frame equipped MEA 34 may not use the resin frame member 50, and may use the electrolyte membrane 52 which protrude outward. Further, the resin frame equipped MEA 34 may be formed by providing frame shaped films on both sides of the electrolyte membrane 52.

In FIG. 3, the first separator 36 and the second separator 38 are made of metal, and has a rectangular shape (quadrangular shape). Each of the first separator 36 and the second separator 38 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. In the state where the first separator 36 and the second separator 38 are overlapped with each other, outer ends of the first separator 36 and the second separator 38 are joined together by welding, brazing, crimping, etc. integrally to form a joint separator 39. The first separator 36 forms a fuel cell separator member 11.

As shown in FIGS. 3 and 4, the first separator 36 has an oxygen-containing gas flow field 58 on its surface 36a facing the MEA 48. The oxygen-containing gas flow field 58 is connected to the oxygen-containing gas supply passage 42a and the oxygen-containing gas discharge passage 42b. The oxygen-containing gas flow field 58 includes a plurality of oxygen-containing gas flow grooves 60 extending straight in the direction indicated by the arrow B. Each of the oxygen-containing gas flow grooves 60 may extend in the direction indicated by the arrow B in a wavy pattern.

A first seal 62 for preventing leakage of the fluid (the oxygen-containing gas, the fuel gas, and the coolant) to the outside from a portion between the MEA 34 and the first separator 36 is provided on the first separator 36. The first seal 62 is formed along the outer peripheral portion of the first separator 36, around each of the fluid passages (e.g., oxygen-containing gas supply passage 42a). The first seal 62 extends straight as viewed in the separator thickness direction (indicated by the arrow A). Alternatively, the first seal 62 may extend in a wavy pattern as viewed in the separator thickness direction.

In FIG. 4, the first seal 62 includes a first metal bead 64 formed integrally with the first separator 36, and a first resin member 66 provided on the first metal bead 64. The first metal bead 64 protrudes from the first separator 36 toward the resin frame member 50. The first metal bead 64 has a trapezoidal shape in lateral cross section which is tapered (narrowed) in a direction in which the first metal bead 64 protrudes. The first resin member 66 is an elastic member fixed to the protruding end surface of the first metal bead 64 by printing or coating, etc. For example, polyester fiber may be used as the first resin member 66.

As shown in FIGS. 3 and 4, the second separator 38 has a fuel gas flow field 68 on its surface 38a facing the MEA 48. The fuel gas flow field 68 is connected to the fuel gas supply passage 46a and the fuel gas discharge passage 46b. The fuel gas flow field 68 includes a plurality of fuel gas flow grooves 70 extending in the direction indicated by the arrow B. Each of the fuel gas flow grooves 70 may extend in a wavy pattern in the direction indicated by the arrow B.

A second seal 72 for preventing leakage of the fluid (the oxygen-containing gas, the fuel gas, and the coolant) to the outside from a portion between the MEA 34 and the second separator 38 is provided on the second separator 38. The second seal 72 is formed along the outer peripheral portion of the second separator 38, around each of the fluid passages (e.g., oxygen-containing gas supply passage 42a). The second seal 72 extends straight as viewed in the separator thickness direction (indicated by the arrow A). Alternatively, the second seal 72 may extend in a wavy pattern as viewed in the separator thickness direction.

In FIG. 4, the second seal 72 includes a second metal bead 74 formed integrally with the second separator 38, and a second resin member 76 provided on the second metal bead 74. The second metal bead 74 protrudes from the second separator 38 toward the resin frame member 50. The second metal bead 74 has a trapezoidal shape in lateral cross section which is tapered (narrowed) in a direction in which the second metal bead 74 protrudes. The second resin member 76 may be made of resin material having elasticity fixed to the protruding end surface of the second metal bead 74 by printing or coating, etc. For example, polyester fiber may be used as the second resin member 76.

The first seal 62 and the second seal 72 are arranged so as to be overlapped with each other as viewed in the separator thickness direction. Therefore, in the state where the tightening load is applied to the fuel cell stack 10, each of the first metal bead 64 and the second metal bead 74 is elastically deformed (deformed by compression). Further, in this state, a protruding end surface of the first seal 62 (first resin member 66) contacts one surface 50a of the resin frame member 50 in an air tight and liquid tight manner, and a protruding end surface of the second seal 72 (second resin member 76) contacts another surface 50b of the resin frame member 50 in an air tight and liquid tight manner.

The first resin member 66 may be provided on one surface 50a of the resin frame member 50 instead of the first metal bead 64. The second resin member 76 may be provided on the other surface 50b of the resin frame member 50 instead of the second metal bead 74. Further, at least one of the first resin member 66 and the second resin member 76 may be dispensed with. The first seal 62 and the second seal 72 may be elastic rubber members instead of metal bead seals.

In FIGS. 3 and 4, a coolant flow field 78 is provided between a surface 36b of the first separator 36 and a surface 38b of the second separator 38. The coolant flow field 78 is connected to the coolant supply passage 44a and the coolant discharge passage 44b. The coolant flow field 78 includes a plurality of coolant flow grooves 80 extending straight in the direction indicated by the arrow B. The coolant flow field 78 is formed on the back surface of the oxygen-containing gas flow field 58 and the back surface of the fuel gas flow field 68.

As shown in FIGS. 2 and 3, each of the fuel cell separator members 11 includes a first separator 36, and two load receiver members 82a, 82b provided on the first separator 36.

Figure 5:
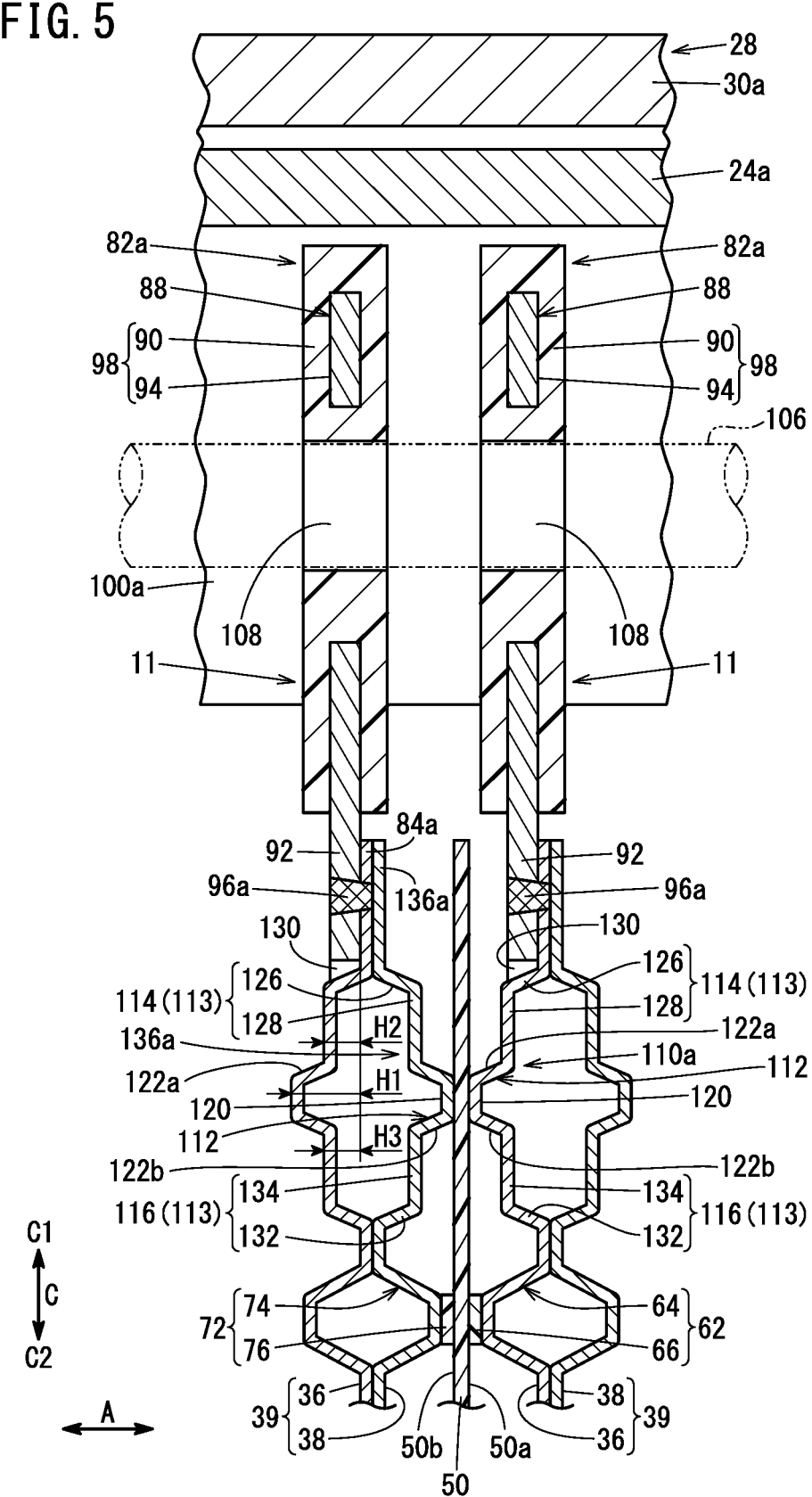
FIG. 5 is a cross sectional view taken along a line V-V in FIG. 2.

As shown in FIGS. 2, 3, and 5, two first support portions 84a, 84b are provided in the first separator 36. The first support portions 84a protrude outward (in the direction indicated by the arrow C1) from one of the long sides (outer peripheral portion) of the first separator 36. The position of the first support portion 84a is shifted from the center of one of the long sides of the first separator 36 toward one end of the first separator 36 so as to face the coupling member 24a (in the direction indicated by the arrow B1). The first support portion 84a is provided integrally with the outer peripheral portion of the first separator 36 by press forming. The first support portion 84a supports the load receiver member 82a.

In FIGS. 2 and 3, the first support portion 84b protrudes outward (in the direction indicated by the arrow C2) from the other of the long sides (outer peripheral portion) of the first separator 36. The position of the first support portion 84b is shifted from the center of the other of the long sides of the first separator 36 toward the other end of the first separator 36 (in the direction indicated by the arrow B2) so as to face the coupling member 24b. The first support portion 84b is provided integrally with the outer peripheral portion of the first separator 36 by press forming.

In the fuel cell separator member 11, the first support portions 84a, 84b may be formed as members separate from the first separator 36, and the first support portions 84a, 84b may be joined to the first separator 36. The first support portions 84a, 84b may not protrude outward from the outer peripheral portion of the first separator 36.

Figure 6:
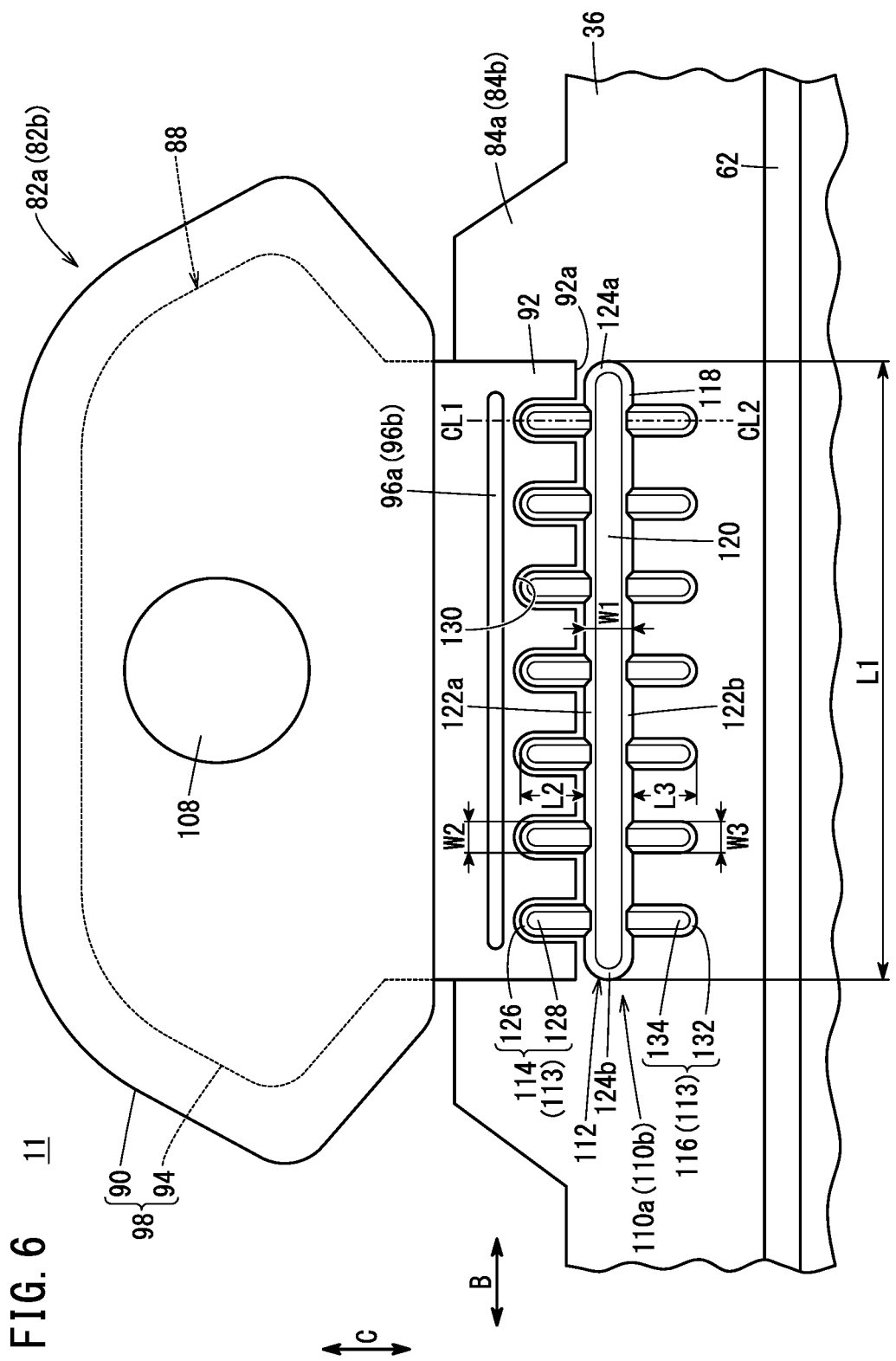
FIG. 6 is a plan view showing a load receiver in FIG. 3.

In FIGS. 5 and 6, the load receiver member 82*a* is provided in the outer peripheral portion of the first separator 36 (first support portion 84*a*) in a manner to protrude outward from the outer peripheral portion of the first separator 36 in the direction indicated by the arrow C1. The load receiver member 82*a* includes a metal plate 88 (core metal), and a resin member 90 which covers the metal plate 88 partially. The load receiver member 82*a* is formed by insert molding.

Examples of materials of the metal plate 88 include the same materials as the materials of the first separator 36 and the second separator 38. The metal plate 88 includes an attachment portion 92 fixed to the first support portion 84*a*, and a base portion 94 coupled to the attachment portion 92 and protruding toward the outside of the first separator 36.

The attachment portion 92 has a substantially rectangular shape, and extends in the direction indicated by the arrow B. The attachment portion 92 is exposed from the resin member 90. The attachment portion 92 is disposed on a surface of the first support portion 84*a* where a resin frame equipped MEA 34 is positioned (surface on the side opposite to a second support portion 86*a*). The attachment portion 92 is joined to the first support portion 84*a* by a joint portion 96*a*. The joint portion 96*a* extends in the direction indicated by the arrow B. The joint portion 96*a* is formed by spot welding, laser welding, MIG welding, TIG welding, brazing, etc.

In FIG. 6, the entire surface of the base portion 94 is covered with the resin member 90. The base portion 94 and the resin member 90 form a tab 98 protruding outward from the outer peripheral portion (first support portion 84*a*) of the first separator 36 in the direction indicated by the arrow C1. The tab 98 of the load receiver member 82*a* is inserted into a recess 100*a* formed in the coupling member 24*a* (see FIG. 5). It should be noted that the coupling member 24*a* may be formed integrally with the cover 28. The coupling member 24*b* may be formed integrally with the cover 28 as well.

As shown in FIG. 5, a circular positioning hole 108 is formed at the center of the tab 98. A rod 106 for positioning each of the fuel cell separator members 11 is inserted into the positioning hole 108 at the time of producing the fuel cell stack 10. It should be noted that the rod 106 may be extracted from the positioning hole 108 after positioning of each of the fuel cell separator members 11 is completed. Alternatively, the rod 106 may be left in the positioning hole 108.

The resin member 90 is an electrically insulating member, and interrupts electrical connection between the base portion 94 and the coupling member 24*a*. Examples of materials of the resin member 90 include thermoplastic resin, thermosetting resin, and thermoplastic elastomer.

As shown in FIGS. 2 and 3, the load receiver member 82*b* has the same structure as the above-described load receiver member 82*a*. Stated otherwise, the load receiver member 82*b* has a shape formed by reversing the load receiver member 82*a* in the direction indicated by the arrow C2. Therefore, the detailed description regarding the structure of the load receiver member 82*b* is omitted. It should be noted that the tab 98 of the load receiver member 82*b* is inserted into a recess 100*b* formed in the coupling member 24*b* (see FIG. 2).

Further, the attachment portion 92 of the load receiver member 82*b* is disposed on a surface of the first support portion 84*b* where the resin frame equipped MEA 34 is positioned (surface on the side opposite to a second support portion 86*b*). The attachment portion 92 of the load receiver member 82*b* is joined to the first support portion 84*b* by a joint portion 96*b*. The joint portion 96*b* has the same structure as the joint portion 96*a*.

As shown in FIGS. 3, 5, and 6, the first separator 36 is provided with rib structures 110*a*, 110*b*. The rib structures 110*a*, 110*b* are formed by press forming of the first separator 36. The rib structures 110*a*, 110*b* are formed integrally with the outer peripheral portion of the first separator 36, and protrude from the outer peripheral portion of the first separator 36 in a separator thickness direction (direction toward the side where the resin frame member 50 is positioned). The rib structures 110*a*, 110*b* protrude in a direction in which the first metal bead 64 protrudes. The rib structure 110*a* is positioned between the first seal 62 and the attachment portion 92 of the load receiver member 82*a*.

As shown in FIGS. 5 and 6, the rib structure 110*a* includes a width direction rib 112 and a reinforcement rib 113. The width direction rib 112 extends along the width direction of the load receiver member 82*a* (tab 98) (along the direction indicated by the arrow B). The width direction rib 112 extends straight along the direction in which the joint portion 96*a* extends (along the direction indicated by the arrow B). The width direction rib 112 extends along the attachment portion 92 of the load receiver member 82*a* in the direction indicated by the arrow B by substantially the same length as the length of the attachment portion 92.

The width direction rib 112 includes a first peripheral wall 118 protruding from the first separator 36 toward the resin frame member 50, and a first top portion 120 provided at a protruding end of the first peripheral wall 118. The first peripheral wall 118 includes a pair of side walls 122*a*, 122*b* facing each other in the direction indicated by the arrow C, and a pair of end walls 124*a*, 124*b* facing each other in the direction indicated by the arrow B.

The side wall 122*a* is positioned closer to the outside of the first separator 36 than the side wall 122*b* is. Each of the pair of side walls 122*a*, 122*b* extends in the direction indicated by the arrow B. The pair of side walls 122*a*, 122*b* are inclined from the separator thickness direction (indicated by the arrow A), toward each other in a trapezoidal shape in a direction in which the side walls 122*a*, 122*b* protrude (see FIG. 5).

The end wall 124*a* couples one ends of the pair of side walls 122*a*, 122*b* together. The end wall 124*b* couples the other ends of the pair of side walls 122*a*, 122*b* together. The end walls 124*a*, 124*b* protrude toward the outside in a circular arc shape, in the direction in which the side walls 122*a*, 122*b* extend.

The first top portion 120 extends in the direction indicated by the arrow B. The protruding end surface of the width direction rib 112 is formed to have a flat shape. It should be noted that the protruding end surface of the width direction rib 112 may be expanded to have a circular arc shape. The protruding end surface of the width direction rib 112 contacts one surface 50*a* of the resin frame member 50.

The reinforcement rib 113 includes a plurality of first extension ribs 114 and a plurality of second extension ribs 116. The plurality of first extension ribs 114 extend from the side wall 122*a* of the width direction rib 112 toward the outside of the first separator 36 (in the direction in which the load receiver member 82*a* protrudes). The extension end of the first extension rib 114 has a circular arc shape.

The plurality of first extension ribs 114 are provided at equal intervals in the direction indicated by the arrow B. The plurality of first extension ribs 114 have the same shape and size. It should be noted that the plurality of first extension ribs 114 may be provided at different intervals in the direction indicated by the arrow B. Further, the plurality of first extension ribs 114 may have different shapes and sizes.

Each of the first extension ribs 114 includes a second peripheral wall 126 protruding from the first separator 36 toward the resin frame member 50, and a second top portion 128 provided at a protruding end of the second peripheral wall 126. Each of the second peripheral wall 126 and the second top portion 128 is coupled to the side wall 122a of the width direction rib 112. The protruding height H2 of the first extension rib 114 is smaller than the protruding height H1 of the width direction rib 112 (see FIG. 5). That is, the second top portion 128 is positioned closer to the first separator 36 than the first top portion 120 is.

The length L2 of each of the first extension ribs 114 in the direction in which the load receiver member 82a protrudes (length in the direction indicated by the arrow C) is smaller than the length L1 of the width direction rib 112 in the width direction of the load receiver member 82a (length in the direction indicated by the arrow B). The width W2 of the first extension rib 114 in the width direction of the load receiver member 82a (width of the rising portion in the direction indicated by the arrow B) is smaller than the width W1 of the width direction rib 112 in the direction in which the load receiver member 82a protrudes (width of the rising portion in the direction indicated by the arrow C).

The first extension ribs 114 are disposed in a plurality of cutouts 130 formed in the attachment portions 92, respectively. The number of the cutouts 130 is the same as the number of the first extension ribs 114. Each of the cutouts 130 is opened to a side surface 92a on the side opposite to the tab 98 of the attachment portion 92. Stated otherwise, each of the cutouts 130 extends from the side surface 92a of the attachment portion 92 toward the joint portion 96a. In FIG. 6, each of the cutouts 130 has a shape formed by reversing the U-shape upside down. The plurality of first extension ribs 114 are provided in a part of the outer peripheral portion of the first separator 36, the part being adjacent to the joint portion 96a.

The plurality of second extension ribs 116 extend from the side wall 122b of the width direction rib 112 toward the inside of the first separator 36 (in the direction opposite to the direction in which the load receiver member 82a protrudes). The plurality of second extension ribs 116 are provided at equal intervals in the direction indicated by the arrow B. The plurality of second extension ribs 116 have the same shape and size. It should be noted that the plurality of second extension ribs 116 may be provided at different intervals in the direction indicated by the arrow B. Further, the plurality of second extension ribs 116 may have different shapes and sizes.

The second extension rib 116 is positioned on the central line CL1 of the first extension rib 114. The central line CL1 of the first extension lib 114 is a line that passes through the center of the first extension rib 114 in the width direction (in the direction indicated by the arrow B), and is parallel with the direction indicated by the arrow C. Specifically, the central line CL2 of the second extension rib 116 is positioned on an extension line of the central line CL1 of the first extension rib 114. The central line CL2 of the second extension rib 116 is a line that passes through the center of the second extension rib 116 in the width direction (in the direction indicated by the arrow B), and is parallel with the direction indicated by the arrow C.

Each of the second extension ribs 116 includes a third peripheral wall 132 protruding from the first separator 36 toward the resin frame member 50, and a third top portion 134 provided at a protruding end of the third peripheral wall 132. Each of the third peripheral wall 132 and the third top portion 134 is coupled to the side wall 122b of the width direction rib 112. In FIG. 5, the protruding height H3 of the second extension rib 116 is smaller than the protruding height H1 of the width direction rib 112. That is, the third top portion 134 is positioned closer to the first separator 36 than the first top portion 120 is. The protruding height H3 of the second extension rib 116 is the same as the protruding height H2 of the first extension rib 114. It should be noted that the protruding height H3 of the second extension rib 116 may be smaller than, or larger than the protruding height H2 of the first extension rib 114

The length L3 of each of the second extension ribs 116 in the direction in which the load receiver member 82a protrudes (length in the direction indicated by the arrow C) is smaller than the length L1 of the width direction rib 112 in the width direction of the load receiver member 82a (length in the direction indicated by the arrow B). Specifically, the length L3 of the second extension rib 116 is the same as the length L2 of the first extension rib 114. It should be noted that the length L2 and the L3 may be different from each other.

The width W3 of the second extension rib 116 in the width direction of the load receiver member 82a (width of the rising portion in the direction indicated by the arrow B) is smaller than the width W1 of the width direction rib 112 in the direction in which the load receiver member 82a protrudes (width of the rising portion in the direction indicated by the arrow C). Specifically, the width W3 of the second extension rib 116 is the same as the width W2 of the first extension rib 114. It should be noted that the width W2 and the W3 may be different from each other.

As shown in FIGS. 5 and 6, each of the second extension ribs 116 has the same structure as the above-described first extension ribs 114. It should be noted that the number, the size, and the shape of the second extension ribs 116 may be different from the number, the size, and the shape of the first extension ribs 114. The second extension rib 116 may be provided at a position shifted from the central line CL1 of the first extension rib 114 in the direction indicated by the arrow B (at a position where the second extension rib 116 is not overlapped with the central line CL1). Only one first extension rib 114 may be provided. Only one second extension rib 116 may be provided. The second extension rib 116 may be dispensed with.

As shown in FIGS. 2 and 3, the rib structure 110b is positioned between the first seal 62 and the attachment portion 92 of the load receiver member 82b. The rib structure 110b has the same structure as the rib structure 110a described above. Therefore, the detailed description regarding the rib structure 110b is omitted.

Two second support portions 86a, 86b are provided in the second separator 38. The second support portion 86a protrudes outward (in the direction indicated by the arrow C1) from one of the long sides (outer peripheral portion) of the second separator 38. The second support portion 86a faces the first support portion 84a. The second support portion 86a is provided integrally with the outer peripheral portion of the second separator 38 by press forming. The second support portion 86a contacts the first support portion 84a, and supports the load receiver member 82a.

In FIG. 3, the second support portion 86b protrudes outward (in the direction indicated by the arrow C2) from the other of the long sides (outer peripheral portion) of the second separator 38. The second support portion 86b faces the first support portion 84b. The second support portion 86b is provided integrally with the outer peripheral portion of the second separator 38 by press forming. The second support portion 86*b* contacts the first support portion 84*b*, and supports the load receiver member 82*b*.

It should be noted that the second support portions 86*a*, 86*b* may be formed as members separate from the second separator 38, and the second support portions 86*a*, 86*b* may be joined to the second separator 38. The second support portions 86*a*, 86*b* may not protrude outward from the outer peripheral portion of the second separator 38.

The second separator 38 is provided with rib structures 136*a*, 136*b*. The rib structures 136*a*, 136*b* have the same structure as the rib structures 110*a*, 110*b* as described above. Therefore, the detailed description regarding the rib structures 136*a*, 136*b* is omitted. The rib structure 110*a* and the rib structure 136*a* are overlapped with each other as viewed in the separator thickness direction. The rib structure 110*b* and the rib structure 136*b* are overlapped with each other as viewed in the separator thickness direction.

In the state where the tightening load (compression load) is applied to the fuel cell stack 10, the protruding end surface of the width direction rib 112 forming the rib structures 110*a*, 110*b* contacts one surface 50*a* of the resin frame member 50, and the protruding end surface of the width direction rib 112 forming the rib structures 136*a*, 136*b* contacts the other surface 50*b* of the resin frame member 50. At this time, no tightening load is applied to each of the rib structures 110*a*, 110*b*, 136*a*, 136*b*. That is, each of the rib structures 110*a*, 110*b*, 136*a*, 136*b* is not deformed elastically. Therefore, the surface pressure of the first seal 62 and the second seal 72 is not released by the rib structures 110*a*, 110*b*, 136*a*, 136*b*. It should be noted that, in the state where the tightening load is applied to the fuel cell stack 10, the protruding end surfaces of the reinforcement rib 113 forming the rib structures 110*a*, 110*b*, 136*a*, 136*b* are spaced from the resin frame member 50.

Next, operation of the fuel cell stack 10 having the above structure will be described.

Firstly, as shown in FIG. 1, the oxygen-containing gas is supplied to the oxygen-containing gas supply passage 42*a* of the end plate 20*a*. The fuel gas is supplied to the fuel gas supply passage 46*a* of the end plate 20*a*. The coolant is supplied to the coolant supply passage 44*a* of the end plate 20*a*.

As shown in FIG. 3, the oxygen-containing gas flows from the oxygen-containing gas supply passage 42*a* into the oxygen-containing gas flow field 58 of the first separator 36. The oxygen-containing gas moves along the oxygen-containing gas flow field 58 in the direction indicated by the arrow B, and the oxygen-containing gas is supplied to the cathode 54 of the MEA 48.

In the meanwhile, the fuel gas flows from the fuel gas supply passage 46*a* into the fuel gas flow field 68 of the second separator 38. The fuel gas moves along the fuel gas flow field 68 in the direction indicated by the arrow B, and the fuel gas is supplied to the anode 56 of the MEA 48.

Thus, in each of the MEAs 48, the oxygen-containing gas supplied to the cathode 54 and the fuel gas supplied to the anode 56 are partially consumed in electrochemical reactions to generate electricity.

Then, the oxygen-containing gas supplied to the cathode 54 is partially consumed at the cathode 54, and the oxygen-containing gas is discharged along the oxygen-containing gas discharge passage 42*b* in the direction indicated by the arrow A. Likewise, the fuel gas supplied to the anode 56 is partially consumed at the anode 56, and the fuel gas is discharged along the fuel gas discharge passage 46*b* in the direction indicated by the arrow A.

Further, the coolant supplied to the coolant supply passage 44*a* flows into the coolant flow field 78 formed between the first separator 36 and the second separator 38, and then, the coolant flows in the direction indicated by the arrow B. After the coolant cools the MEA 48, the coolant is discharged from the coolant discharge passage 44*b*.

In the embodiment of the present invention, when an external load in the direction indicated by the arrow B is applied from the outside to the fuel cell stack 10, the tab 98 of the load receiver member 82*a* contacts the wall surface forming the recess 100*a* of the coupling member 24*a*, and the tab 98 of the load receiver member 82*b* contacts the wall surface forming a recess 92*b* of the coupling member 24*b*. That is, the load receiver member 82*a*, 82*b* receive the external load in the direction indicated by the arrow B. In this manner, it is possible to suppress positional displacement of the fuel cell separator member 11 in the direction indicated by the arrow B.

The fuel cell separator member 11 and the power generation cell 12 (fuel cell) according to the embodiment offers the following advantages.

The reinforcement rib 113 extending in the direction in which the load receiver member 82*a*, 82*b* protrudes is provided in a part of the outer peripheral portion of the first separator 36, the part being adjacent to the joint portion 96*a*, 96*b*.

In the structure, the reinforcement rib 113 can improve the joining strength of joining the outer peripheral portion of the first separator 36 and the load receiver member 82*a*, 82*b* together. Further, the reinforcement rib 113 extends in the direction (indicated by the arrow C) perpendicular to the direction (indicated by the arrow B) in which the external load is applied to the load receiver member 82*a*, 82*b*. Therefore, when the external load is applied to the fuel cell stack 10, it is possible to effectively suppress deformation of a part of the outer peripheral portion of the first separator 36, the part supporting the load receiver member 82*a*, 82*b* (first support portion 84*a*, 84*b*).

The reinforcement rib 113 is formed integrally with the outer peripheral portion of the first separator 36, and protrudes from the outer peripheral portion of the first separator 36 in the separator thickness direction.

In the structure, it is possible to further improve the joining strength of joining the outer peripheral portion of the first separator 36 and the load receiver member 82*a*, 82*b* together.

The width direction rib 112 extending in the width direction of the load receiver member 82*a*, 82*b* is provided in the outer peripheral portion of the first separator 36. The reinforcement rib 113 extends from the width direction rib 112 in the direction in which the load receiver member 82*a*, 82*b* protrudes.

In the structure, it is possible to further improve the joining strength of joining the outer peripheral portion of the first separator 36 and the load receiver member 82*a*, 82*b* together.

The reinforcement rib 113 includes the first extension rib 114 extending from the width direction rib 112 toward the joint portion 96*a* (joint portion 96*b*), and the second extension rib 116 extending from the width direction rib 112 in a direction opposite to a direction in which the first extension rib 114 extends.

In the structure, it is possible to effectively improve the joining strength of joining the outer peripheral portion of the first separator 36 and the load receiver member 82*a*, 82*b* together.

The first extension rib 114 and the second extension rib 116 are each provided in plurality in the width direction of the load receiver member 82a, 82b.

In the structure, it is possible to further improve the joining strength of joining the outer peripheral portion of the first separator 36 and the load receiver member 82a, 82b together.

The protruding height H2, H3 of the reinforcement rib 113 is smaller than the protruding height H1 of the width direction rib 112.

In the structure, since the step is formed between the width direction rib 112 and the reinforcement rib 113, it is possible to effectively increase the rigidity of the rib structures 110a, 110b.

The cutout 130 in which the reinforcement rib 113 is disposed is formed in the load receiver member 82a, 82b.

In the structure, it is possible to easily dispose the reinforcement rib 113 adjacent to the joint portion 96a, 96b. Stated otherwise, it is possible to relatively increase the distance from the joint portion 96a, 96b of the attachment portion 92 to the side surface 92a of the attachment portion 92 in the load receiver member 82a, 82b. Therefore, it is possible to suppress tilt of the load receiver member 82a, 82b in the separator thickness direction.

The present invention is not limited to the above embodiment. Various modifications can be made without departing from the gist of the present invention.

The load receiver member 82a, 82b may be provided on the second support portion 86a, 86b of the second separator 38 instead of the first separator 36. Further, the load receiver member 82a, 82b may be provided on the second support portion 86a, 86b of the second separator 38 in addition to the first support portion 84a, 84b of the first separator 36. The load receiver member 82a, 82b may be positioned between the outer peripheral portion (first support portion 84a, 84b) of the first separator 36 and the outer peripheral portion (second support portion 86a, 86b) of the second separator 38.

The above embodiment can be summarized as follows:

The above embodiment discloses the fuel cell separator member (11) including the separator (36), the load receiver member (82a, 82b) disposed in a manner to protrude outward from the separator, and the joint portion (96a, 96b) configured to join the outer peripheral portion of the separator and the load receiver member together. The reinforcement rib (113) extending in a direction in which the load receiver member protrudes is provided in a part of the outer peripheral portion of the separator, the part being adjacent to the joint portion.

In the above fuel cell separator member, the reinforcement rib may be formed integrally with the outer peripheral portion of the separator, and protrudes from the outer peripheral portion of the separator in the separator thickness direction.

In the above fuel cell separator member, the outer peripheral portion of the separator may be provided with the width direction rib (112) extending in a width direction of the load receiver member perpendicular to the separator thickness direction and the direction in which the load receiver member protrudes. Further, the reinforcement rib may extend from the width direction rib.

In the above fuel cell separator member, the reinforcement rib may include the first extension rib (114) extending from the width direction rib toward the joint portion, and the second extension rib (116) extending from the width direction rib in a direction opposite to a direction in which the first extension rib extends.

In the above fuel cell separator member, the first extension rib and the second extension rib may each be provided in plurality in the width direction of the load receiver member.

In the above fuel cell separator member, the protruding height (H2, H3) of the reinforcement rib may be smaller than the protruding height (H1) of the width direction rib.

In the above fuel cell separator member, the length (L2, L3) of the reinforcement rib in the direction in which the load receiver member protrudes may be smaller than the length (L1) of the width direction rib in the width direction of the load receiver member.

In the above fuel cell separator member, the width (W2, W3) of the reinforcement rib in the width direction of the load receiver member may be smaller than the width (W1) of the width direction rib in the direction in which the load receiver member protrudes.

In the above fuel cell separator member, the cutout (130) in which the reinforcement rib is disposed may be formed in the load receiver member.

In the above fuel cell separator member, the extension end of the reinforcement rib may have a circular arc shape.

In the above fuel cell separator member, the second extension rib may be positioned on the central line (CL1) passing through the center of the first extension rib in the width direction thereof.

The above embodiment discloses the fuel cell (12) including the membrane electrode assembly (48) including the electrolyte membrane (52), and the electrodes (54, 56) provided on both sides of the electrolyte membrane, and the pair of separators (36, 38) provided on both sides of the membrane electrode assembly. At least one of the separators of the pair forms the fuel cell separator member described above.

What is claimed is:

1. A fuel cell separator member comprising:
   a separator;
   a load receiver member disposed in a manner to protrude outward from the separator; and
   a joint portion configured to join an outer peripheral portion of the separator and the load receiver member together,
   wherein:
   a reinforcement rib extending in a direction in which the load receiver member protrudes is provided in a part of the outer peripheral portion of the separator, the part being adjacent to the joint portion;
   the outer peripheral portion of the separator is provided with a width direction rib; and
   a protruding height of the reinforcement rib is smaller than a protruding height of the width direction rib.

2. The fuel cell separator member according to claim 1, wherein the reinforcement rib is formed integrally with the outer peripheral portion of the separator, and protrudes from the outer peripheral portion of the separator in a separator thickness direction.

3. The fuel cell separator member according to claim 2, wherein the outer peripheral portion of the separator is provided with the width direction rib extending in a width direction of the load receiver member perpendicular to the separator thickness direction and the direction in which the load receiver member protrudes, and
   the reinforcement rib extends from the width direction rib.

4. The fuel cell separator member according to claim 3, wherein the reinforcement rib comprises:
   a first extension rib extending from the width direction rib toward the joint portion; and a second extension rib extending from the width direction rib in a direction opposite to a direction in which the first extension rib extends.

5. The fuel cell separator member according to claim 4, wherein the first extension rib and the second extension rib are each provided in plurality in the width direction of the load receiver member.

6. The fuel cell separator member according to claim 3, wherein a length of the reinforcement rib in the direction in which the load receiver member protrudes is smaller than a length of the width direction rib in the width direction of the load receiver member.

7. The fuel cell separator member according to claim 3, wherein a width of the reinforcement rib in the width direction of the load receiver member is smaller than a width of the width direction rib in the direction in which the load receiver member protrudes.

8. The fuel cell separator member according to claim 1, wherein a cutout in which the reinforcement rib is disposed is formed in the load receiver member.

9. The fuel cell separator member according to claim 1, wherein an extension end of the reinforcement rib has a circular arc shape.

10. The fuel cell separator member according to claim 4, wherein the second extension rib is positioned on a central line passing through a center of the first extension rib in a width direction thereof.

11. A fuel cell comprising:
a membrane electrode assembly including an electrolyte membrane, and electrodes provided on both sides of the electrolyte membrane; and
a pair of separators provided on both sides of the membrane electrode assembly,
wherein:
at least one of the separators of the pair forms a fuel cell separator member,
the fuel cell separator member comprises a load receiver member disposed in a manner to protrude outward from the separator, and a joint portion configured to join an outer peripheral portion of the separator and the load receiver member together,
a reinforcement rib extending in a direction in which the load receiver member protrudes is provided in a part of the outer peripheral portion of the separator, the part being adjacent to the joint portion;
the outer peripheral portion of the separator is provided with a width direction rib; and
a protruding height of the reinforcement rib is smaller than a protruding height of the width direction rib.

12. The fuel cell according to claim 11, wherein the reinforcement rib is formed integrally with the outer peripheral portion of the separator, and protrudes from the outer peripheral portion of the separator in a separator thickness direction.

13. The fuel cell according to claim 12,
wherein the outer peripheral portion of the separator is provided with the width direction rib extending in a width direction of the load receiver member perpendicular to the separator thickness direction and the direction in which the load receiver member protrudes, and
the reinforcement rib extends from the width direction rib.

14. The fuel cell according to claim 13, wherein the reinforcement rib comprises:
a first extension rib extending from the width direction rib toward the joint portion; and
a second extension rib extending from the width direction rib in a direction opposite to a direction in which the first extension rib extends.

15. The fuel cell according to claim 14, wherein the first extension rib and the second extension rib are each provided in plurality in the width direction of the load receiver member.

16. The fuel cell according to claim 13, wherein a length of the reinforcement rib in the direction in which the load receiver member protrudes is smaller than a length of the width direction rib in the width direction of the load receiver member.

17. The fuel cell according to claim 13, wherein a width of the reinforcement rib in the width direction of the load receiver member is smaller than a width of the width direction rib in the direction in which the load receiver member protrudes.

18. The fuel cell according to claim 11, wherein a cutout in which the reinforcement rib is disposed is formed in the load receiver member.

* * * * *